United States Patent [19]
Clampitt

[11] 3,797,320
[45] Mar. 19, 1974

[54] ELECTRONIC DITHER CIRCUIT FOR A MECHANICAL BEARING ASSEMBLY AND METHOD AND ACCELEROMETER USING THE SAME

[75] Inventor: Robert L. Clampitt, Walnut Creek, Calif.

[73] Assignee: Systron-Donner Corporation, Concord, Calif.

[22] Filed: Nov. 29, 1972

[21] Appl. No.: 310,551

[52] U.S. Cl.................. 73/496, 73/517 B, 318/631
[51] Int. Cl....................... G01p 15/08, G01d 11/14
[58] Field of Search.............. 73/496, 517 B, 516 R; 318/631

[56] References Cited
UNITED STATES PATENTS

| | | | |
|---|---|---|---|
| 2,550,030 | 4/1951 | Wild | 318/631 X |
| 3,110,851 | 11/1963 | Plogstedt et al. | 318/631 |
| 3,280,781 | 10/1966 | Koerner | 318/631 X |

*Primary Examiner*—James J. Gill
*Attorney, Agent, or Firm*—Flehr, Hohbach, Test, Albritton & Herbert

[57] ABSTRACT

Electronic dither circuit for a mechanical bearing assembly having a housing with a member disposed in the housing. Means is provided in the form of a mechanical bearing assembly for pivotally mounting the member in the housing for movement about a pivot axis. Means is mounted in the housing forming a magnetic field in the housing. A torque coil is connected to the member and is disposed in the magnetic field. Electronic means is provided for supplying electrical energy to the torque coil. The electronic means includes a damped closed loop servo system and means for removing the damping from the closed loop servo to cause the servo loop to oscillate to thereby supply oscillatory electrical energy to said torque coil to cause the torque coil to oscillate and to thereby minimize the effects of friction.

In the method, the damping is removed from the closed loop servo for a predetermined period of time to permit the servo loop to oscillate. The damping is gradually restored to the servo loop over a predetermined period of time. The electronic dither circuit and method are particularly useful in connection with accelerometers.

17 Claims, 3 Drawing Figures

ELECTRONIC DITHER CIRCUIT FOR A MECHANICAL BEARING ASSEMBLY AND METHOD AND ACCELEROMETER USING THE SAME

BACKGROUND OF THE INVENTION

In the patent application entitled "Pivot Mechanism with Electronic Dither Circuit" filed in the name of Harold D. Morris under Ser. No. 251,392, filed May 8, 1972, which is a continuation of application Ser. No. 47,271, filed June 18, 1970, there is disclosed a pivot mechanism with electronic dither circuit in which means is provided for modulating the oscillator to cause the conducting planar element to move back and forth through a null position. A second order filter is utilized for introducing the harmonic into the oscillator circuit. In the use of this electronic dither circuit, it has been found that the additional circuitry required occupies considerable space and requires a relatively large number of components. There is a need for such circuitry which requires less electronics and less space. In addition, it has been found that there is a need for such circuitry which gives improved results.

SUMMARY OF THE INVENTION AND OBJECTS

The electronic dither circuit is for use with a mechanical bearing assembly and is comprised of a housing with a member disposed in the housing. Means is provided in the housing in the form of a mechanical bearing assembly for pivotally mounting the member in the housing for movement about a pivot axis. Means is mounted in the housing forming a magnetic field. A torque coil is mounted in the housing and is connected to the member and is disposed in the magnetic field. Electronic means is provided for supplying electrical energy to the torque coil. The electronic means includes a damped closed loop servo system with means for removing the damping from the servo loop to cause the servo loop to oscillate to thereby supply oscillatory energy to the torque coil to cause the torque coil to oscillate back and forth through null to thereby minimize the effects of friction in the mechanical bearing assembly.

In general, it is an object of the present invention to provide an electronic dither circuit which requires a smaller amount of circuitry and a smaller number of components.

Another object of the invention is to provide an electronic dither circuit of the above character in which damping is removed from the servo loop to create the dither upon application of electrical power.

Another object of the invention is to provide an electronic dither circuit of the above character in which damping from the servo circuit is removed for a predetermined period of time.

Another object of the invention is to provide an electronic dither circuit of the above character in which the damping is gradually restored after it has been removed.

Another object of the invention is to provide an electronic dither circuit and method which provides improved results.

Another object of the invention is to provide an electronic dither circuit and method of the above character which is particularly applicable for use with accelerometers.

Additional objects and features of the invention will appear from the foregoing description in which the preferred embodiments are set forth in detail in conjunction with the accompanying drawings.

DESCRIPTION OF PREFERRED EMBODIMENTS

Figure 1:
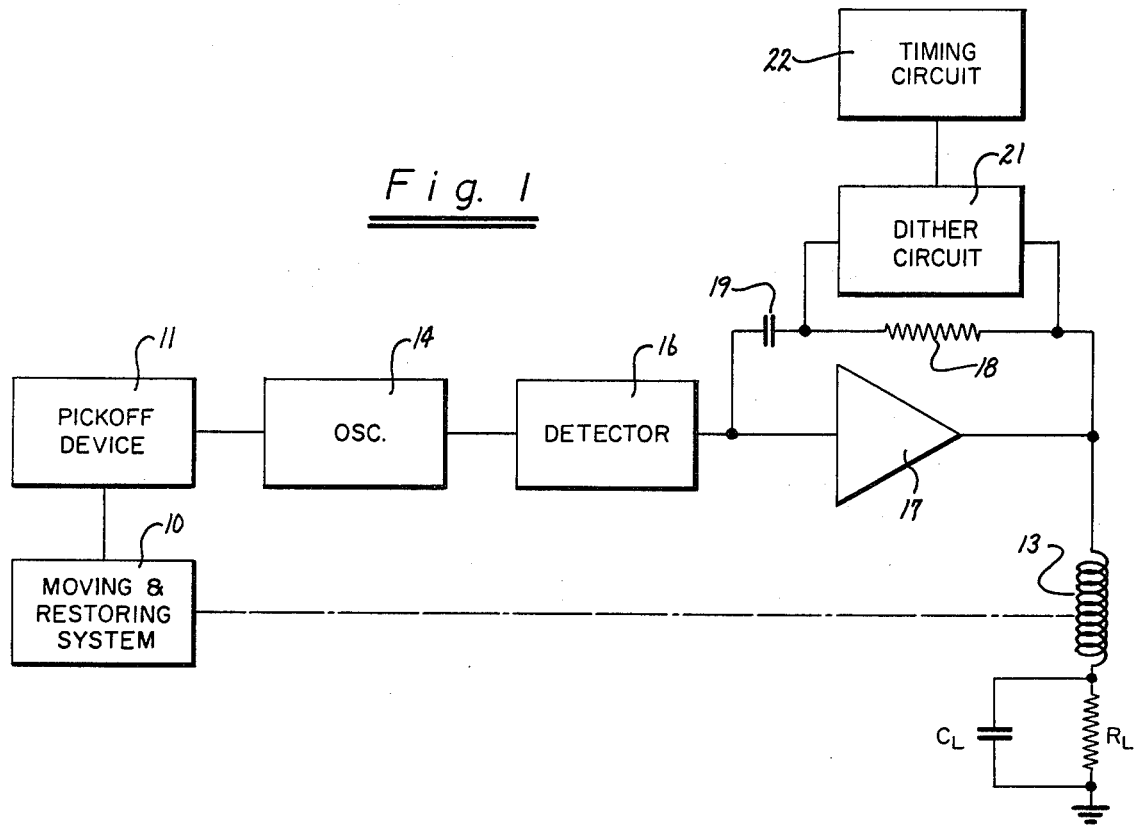
FIG. 1 is a block diagram showing utilization of an electronic dither circuit incorporating the present invention in connection with a servo accelerometer of the type described in Morris U.S. Pat. No. 3,074,279.

In FIG. 1, there is shown a block diagram of an electronic dither circuit incorporating the present invention in connection with a servo accelerometer of the type described in Morris U.S. Pat. No. 3,074,279. As disclosed therein, such a servo accelerometer consists of a moving and restoring system 10 and a pickoff device 11. The moving and restoring system 11 includes a restoring coil 13 which is utilized for restoring the moving element or member to a null position. The pickoff device 11 senses the position of the moving system and supplies its output to an oscillator 14. The output of the oscillator 14 is supplied to a detector 16 which has its output amplified by an operational amplifier 17. The output of the operational amplifier 17 is supplied through the force restoring coil 13 through the resistance $R_L$ and phase lead capacitor $C_L$ to ground. A serially connected resistor 18 and a capacitor 19 are connected between the output and the input of the amplifier 17 and serve as means providing phase lead to provide a damped servo loop. A dither circuit 21 is provided for removing the damping in the feedback or servo loop. A timing circuit 22 is provided for controlling the return of damping to the servo loop. Upon application of electrical power to the servo accelerometer, timing circuit 22 starts timing. During this period of timing, the dither circuit 21 is activated and represents a low resistance electrical shunt across feedback resistor 18.

Under action of acceleration, a force is generated on the moving system 10 which tends to develop a displacement. As movement takes place, the oscillator 14, the detector 16 and the amplifier 17 serve as a position error detector and servo amplifier and generate a rapidly increasing feedback signal which provides a current through the restoring coil 13. The dither circuit 21 removes the damping for a predetermined period of time which causes the closed servo loop to be unstable and oscillate. The timing circuit 22 permits the dither circuit 21 to gradually reduce the shunting of feedback resistor 18 and thereby restabilizes thee servo loop. Therefore, after a predetermined period of time, the oscillation gradually dies away and the servo loop becomes properly damped for normal operation. Additional features of the present invention will be apparent from the description and operation of the detailed circuitry shown in FIG. 3.

Figure 2:
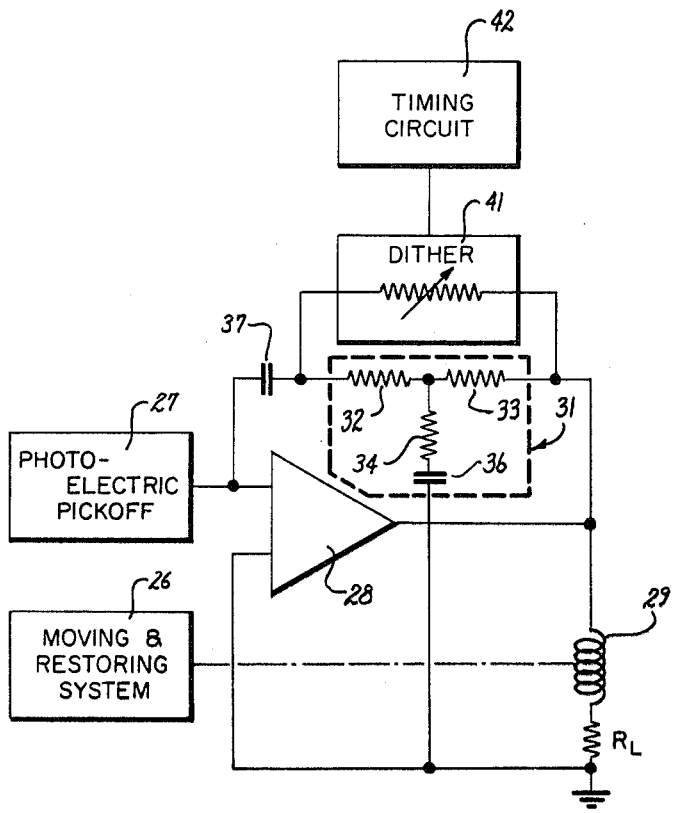
FIG. 2 is a block diagram of an electronic dither circuit incorporating the present invention showing the use of the same with a photoelectric type pickoff in an accelerometer of the type disclosed in Hirtreiter U.S. Pat. No. 3,295,378.

In FIG. 2 there is shown another block diagram of an electronic dither circuit incorporating the present invention for use with a photoelectric pickoff of the type disclosed in Hirtreiter U.S. Pat. No. 3,295,378. As disclosed therein, it consists of a moving and restoring system 26 in which the position of the moving element is sensed by a photoelectric pickoff 27. The output of the photoelectric pickoff is supplied to an amplifier 28, the output of which is supplied to a restoring coil 29 and through a load resistance $R_L$ to ground. A phase-lead network 31 is provided consisting of two serially connected resistors 32 and 33 which are connected to ground at the mid-point between the two resistors by a resistor 34 and a capacitor 36. The purpose of this network 31 is to provide a damping signal or a change in the transfer function to provide damping for the servo loop. This network causes the gain at high frequencies to be much higher than the gain at low frequencies. The functioning of the feedback network is augmented by the capacitor 37 in series with the feedback line to the input of the amplifier 28 to remove all feedback at zero frequency so that the amplifier operates at maximum gain for zero frequency servo rebalance and operates at a controlled gain controlled by the network across the amplifier and the capacitor 37 which serves as a short-circuit at higher frequencies as, for example, 10 cycles. Thus, the network then functions for frequencies above 10 cycles and causes a controlled gain in this mid-band region which can be called a plateau gain. The shunt resistor-capacitor to ground portion of the network causes feedback across the amplifier to be reduced as frequency increases and thereby causes the amplifier total gain to increase with frequency. A change in gain with frequency produces a phase-lead characteristic in the total loop of the servo accelerometer and thereby produces a phase-lead characteristic which is a maximum in the middle of the rising curve on the transfer function. The dither circuit 41, as shown, can consist of a variable resistance in the form of a photocell which, when connected across the phase-lead network 31, effectively shunts out the rise in gain characteristic of the phase-lead network and in fact lowers the overall gain of the servo loop significantly by providing a low resistance shunt directly across the lead network. This removal of the phase lead and the addition of more phase lag makes the servo loop unstable and causes it to go into oscillation. The timing circuit 42 causes the resistance of the photocell to gradually increase which gradually restores the servo loop to its full capability.

Figure 3:
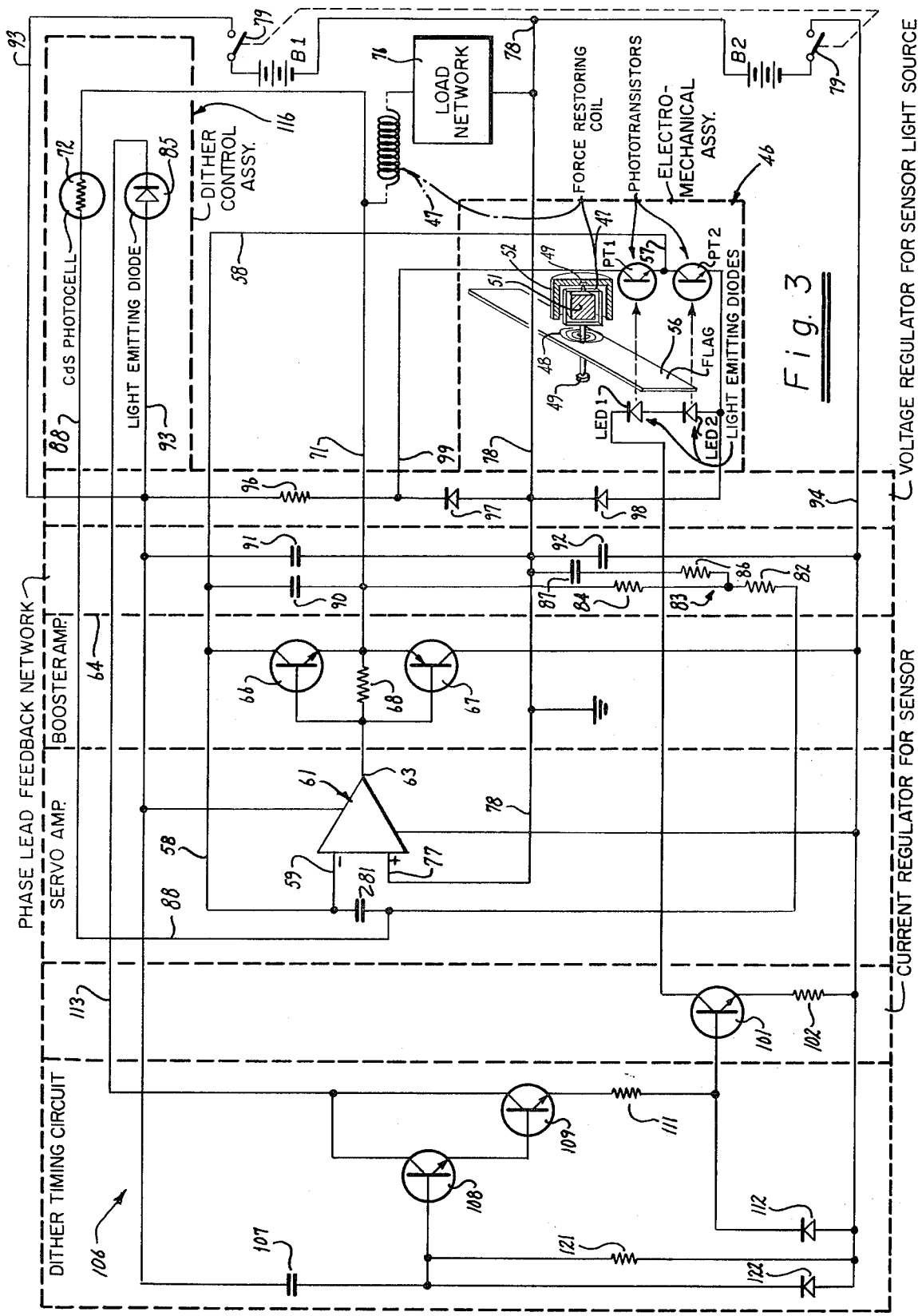
FIG. 3 is a detailed circuit diagram of an accelerometer of the type shown in FIG. 2.

FIG. 3 is a relatively detailed circuit diagram of an electronic dither circuit utilized in conjunction with a photoelectric pickoff.

The electro-mechanical assembly 46, only a portion of which is shown schematically in FIG. 3, can be substantially conventional as, for example, of the type disclosed in Hirtreiter U.S. Pat. No. 3,295,278. As therein shown, it is in the form of a torquer assembly of a conventional type such as a D'Arsonval meter movement consisting of a rectangular torque coil 47 with hairsprings 48 which are connected to the torque coil for providing a restoring current to the torque coil. The torque coil is supported by two bearing assemblies 49 at opposite ends which are of the pivot and jewel type. A magnet 51 within the torque coil is in the form of a cylindrical slug which is magnetized north and south at 90° to the axis of the torque coil 47. A return path is provided in the form of a cylinder 52 in which the magnetic cylinderical slug is mounted.

A flag or paddle 56 is mounted on the force restoring coil 47 and moves with the force restoring coil. The flag or paddle 56 is positioned so that it is adapted to control the passage of light from a pair of light emitting elements such as light emitting diodes LED1 and LED2. Light from the light emitting diodes LED1 and LED2 which passes the flag 56 is sensed by suitable photoelectric sensing means as, for example, phototransistors PT1 and PT2. When the flag or paddle 56 is in its initial rest position, light emitted from the diodes LED1 and LED2 equally illuminates the phototransistors PT1 and PT2 so that the circuitry shown in FIG. 3 is in a balanced or steady state condition.

When an external force is applied to the system as, for example, when the system is accelerated, the flag or paddle 56 moves. Movement in one direction causes more illumination of phototransistor PT2 and less illumination of phototransistor PT1 with a corresponding increase of collector current of PT2 and decrease in PT1. The two phototransistors PT1 and PT2 are connected in series as shown and the junction of the emitter and collector serves as a summing junction 57 for the unbalanced collector currents. This unbalance or net current is applied through a conductor 58 to the inverting input 59 of a conventional operational amplifier 61 of a suitable type such as Motorola type MC1536 having a gain of at least 50,000. The operational amplifier 61 serves as a servo amplifier for the circuit. The output from the operational amplifier 61 is supplied to an output terminal 63 which is connected to a booster amplifier 64 consisting of an NPN transsistor 66 and a PNP transistor 67 connected as shown. The transistors 66 and 67 can be of any suitable type. For example, the transistor 66 can be a 2N2222A, whereas the transistor 67 can be a 2N2907A. The emitters of the two transistors are connected in series and together are connected to one end of a resistor 68 which is connected to the output 63 of the operational amplifier 61 and also is connected to the bases of the two transistors 66 and 67. The resistor 68 serves to provide a current path and shunts any leakage from collector to base of the transistors and thereby prevents unwanted turn-on of the transistors 66 and 67 when little or no power output is required. The output of the booster amplifier 64 is supplied from the junction of the emitters of the transistors 66 and 67 by a conductor 71 to one side of the force restoring coil 47. The force restoring coil 47 is connected through a load network 76. The load network 76 is connected to electrical ground and non-inverting input 77 of the operational amplifier 61 by a conductor 78. Conductor 78 is connected between the power supplies B1 and B2.

Means is provided for making the system unstable at the time that power is turned on to the system by closing of switches 79 and for maintaining instability for a predetermined period of time and for permitting the instability to die out gradually over a predetermined period of time for the purpose of relieving stiction in the bearing system as hereinafter described. This system includes the operational amplifier 61, the force restoring coil 47 and the electro-mechanical assembly 46.

Additional feedback means is provided around the operational amplifier for introducing this instability into the system by providing a damping signal or change in the transfer function of the operational amplifier to provide damping for the servo loop. The damping is accomplished by placing in shunt with the feedback line 58, a capacitor 81 connected in series with a resistor 82 to conductor 83. The capacitor 81 in series with the feedback line to the junction of the operational amplifier 61 removes all feedback at zero frequency so that the operational amplifier 61 operates at maximum gain for zero frequency servo rebalance and operates at a controlled gain as controlled by the network across the amplifier after the capacitor 81 turns into a short circuit at a higher frequency as, for example, 10 cycles. The network then functions for frequencies above 10 cycles to provide feedback to the operational amplifier 61 and causes a controlled gain in a midband region which can be called a plateau gain.

In other words, the shunt resistor-capacitor path to ground forming a part of the feedback network through the capacitor 81 and resistor 82 causes the feedback across the operational amplifier 61 to be reduced as the frequency is increased and thereby causes the total gain of the operational amplifier 61 to increase with frequency to a new value which, by way of example, can be approximately 5 times higher at the higher frequency end of the frequency spectrum than the gain at, for example, 120 Hz. This change of gain with frequency produces a phase-lead characteristic in the total loop of the servo system and thereby produces a phase-lead characteristic which is a maximum in the middle of the rising curve on the transfer function. Thus, the transistion from a low plateau gain to a much higher gain at high frequencies as, for example, 5 times as pointed out above, there is a 6 db per octave slope connecting the two levels of gain and in the middle of this, i.e. half-way up the slope, maximum phase-lead is achieved. This maximum phase-lead is tuned to agree with the nominal zero db servo loop closure so that there would be maximum stability of the servo loop for normal operation.

When the dither circuit with its activated light emitting diode 85 and photocell 72 is connected across the phase-lead network, it effectively shunts out the rise in the gain characteristic of the phase-lead network and indeed lowers the overall gain of the servo loop significantly by providing a low resistance shunt directly across the phase-lead network. The phase-lead network consists of a series combination of two resistors having the same values, one of which is the resistor 82 and the other of which is a resistor 84 with another resistor 86 and a capacitor 87 connected in series and connected at a point between the two resistors 82 and 84 and which are connected to the conductor 83. These resistors and cpacitors provide the rise in gain characteristic previously described. Damping of the rise in gain is prevented by utilizing a low value of resistance in the form of the photocell 72 from the output of the amplifier by the feedback line 88 which is supplied to the junction of the capacitor 81 and resistor 82 as hereinafter described. The low resistance of the photocell 72 when light emitting diode 85 is activated effectively shunts out the damping characteristic of the phase-lead network and in so doing removes the phase-lead and, in addition, causes an additional phase-lag acting in conjunction with the series capacitor 81 which is very close to the junction 59 of the operational amplifier 61. This removal of the phase-lead and the addition of more phase lag creates instability of the servo loop so that there is no longer a properly damped servo. It thus becomes totally unstable and goes into oscillation. This causes an oscillating output to be provided by the operational amplifier 61 which is supplied to the force restoring coil 47 which, in turn, causes rocking or oscillatory movement of the force restoring coil to cause movement of the pivots in the bearings. Thus, the bearing-pivot interface is oscillated at a frequency at which the servo loop is resonating. This greatly reduces the friction normally called stiction between the pivots and bearings.

As the dither timing circuit completes its timing cycle, the current in the light emitting diode 85 is gradually reduced, thus reducing its light output. This causes the resistance of the photocell 72 to increase gradually and this causes the servo loop to be restored back to its normal operating condition so that the phase-lead network 89 reenters the scene and is restored to its full capability and thereby reestablishes the stability of the servo loop. Therefore, the oscillation in the servo loop gradually dies away until the servo becomes properly damped for normal operation.

As pointed out above, in order to throw the servo loop into oscillation, it is necessary to remove the stabilizing phase-lead which is in the system. A variety of different means can be utilized for taking away this phase-lead margin of the servo system to cause the servo loop to be unstable and to cause it to oscillate to thereby produce the dither which is so useful in the present invention. As explained above, this is accomplished by the capacitor 81 which, in addition, has several other functions. The capacitor 81 serves to provide maximum gain at d.c. or zero frequency. It effectively disconnects the phase-lead network as very low frequencies are encountered. The capacitor 81 also shunts out the phase-lead network while at the same time increasing the amount of phase lag. Thus, in addition to removing the phase-lead, the phase lag is increased. The use of a photocell across the phase-lead network is particularly useful because it adds phase lag as well as removing the phase-lead. Without the capacitor 81, the photocell would merely remove the phase-lead but would not add phase lag.

It should be appreciated, however, that it is not absolutely essential that the capacitor 81 be provided. It is possible that a servo system would oscillate without a phase-lead network. This would be the case if the servo loop has more than two time constants which would make the servo loop unstable without the phase-lead network and so the servo loop could be thrown into oscillation by the mere use of a photocell. However, the use of a capacitor such as capacitor 81 is preferable because the capacitor provides the dual advantages of maximum gain at d.c. and the ability to throw in phase lag as dither is introduced.

In this connection, it should be appreciated that all photoresistors have a very limited bandwidth and tend to make servo systems oscillate due to their own lag. The photoresistors serves as a variable control element. Such a variable control element can be any electronic element that is controllable by voltage or current and thus includes bipolar and field effect transistors as well as junction and metal oxide semiconductors. Photocell photoresistors are particularly satisfactory because they are in effect a linear resistor whose value is controllable by the amount of light. Since it is a linear circuit element, its operation and function can be readily analyzed and utilized as a part of a control system.

A capacitor 90 is connected between the output of the operational amplifier 61 and the line 58 and serves to stabilize the operation of the operational amplifier 61 at high gain for the operational amplifier.

Two capacitors 91 and 92 are connected to the line 78 and to lines 93 and 94 and serve to protect the operational amplifier 61 from extraneous noises on the power lines. As shown in the drawing, line 94 is connected to −28 volts d.c. supplied by a power supply represented by battery B2 through the switch 79, whereas line 93 is connected to +28 volts d.c. by a power supply represented by a battery B1 through the switch 79.

Voltage regulator means is provided for supplying a regulated voltage to the phototransistors PT1 and PT2. This means consists of a resistor 96 which has one end connected to the line 93 and has the other end connected to two serially connected zener diodes 97 and 98 which supply the reference voltage to the phototransistors PT1 and PT2. As can be seen from FIG. 3, the junction of the resistor 96 and the zener diode 97 is connected by line 99 to the collector of the phototransistor PT1. The other end of the zener diode 97 is connected to line 78 which establishes a ground reference for the signal output as well as the power supplied. The other end of the zener diode 98 is connected to one end of the serially connected light sources LED1 and LED2 and the other end of the light emitting diodes LED1 and LED2 is connected to the collector of emitter-follower type current regulator in the form of a transistor 101. The collector current of the transistor is controlled by an emitter resistor 102 connected to the line 94. This collector current is also the current which flows through the light emitting diodes LED1 and LED2. The other side of the zener diode 98, in addition to being connected to the light emitting diodes LED1 and LED2, is also connected to the emitter of the phototransistor PT2.

Timing means is provided for controlling the reestablishment of normal operation of the servo loop and consists of a dither timing circuit 106. The dither timing circuit applies a dithering signal to the servo loop for a predetermined period of time as, for example, 900 milliseconds which is automatically terminated by the timing circuit after the predetermined period of time has elapsed. As shown in FIG. 3, the timing circuit can be in the form of a simple RC charging circuit consisting of a capacitor 107 which is selected to provide the desired time delay. One end of the capacitor is connected to the positive 28 volt line 93 and the other end is connected to the base of a transistor 108 which has its emitter connected to the base of another transistor 109. The emitter of the transistor 109 is connected to one side of a resistor 111 and the other side of the resistor 111 is connected to one side of a zener diode 112 which is connected to the −28 volt d.c. line. The collectors of the two transistors 108 and 109 are interconnected and are connected to a line 113. The transistors 108 and 109 are connected to form a Darlington amplifier.

The line 113 is connected to a dither control assembly 116 consisting of a light emitting diode 85 and the other side of the light emitting diode 85 is connected to the +28 volt d.c. line. A resistor 121 is connected in series with the capacitor 107 and is connected to the −28 volt d.c. line 94. A diode 122 is coupled to the base of the transistor 108 and to the −28 volt d.c. line 94 and is utilized for preventing base to emitter breakdown of the Darlington transistors 108 and 109. A resistor 111 is provided for supplying sufficient current to the zener diode 112 which is utilized as a voltage reference for the current regulator formed by the transistor 101.

The resistor 121 in series with the capacitor 107 forms the simple RC charging circuit which is utilized in the dither timing circuit. The RC timing circuit provides a predetermined time delay as, for example, the 900 milliseconds which is utilized for charging the capacitor. During this period of time, current is flowing in the emitter-follower arrangement of the Darlington transistors 108 and 109. The charging capacitor 107 causes the base voltage on the Darlington transistor 108 to decrease exponentially to line voltage. In the process of doing so, current is caused to flow through the Darlington transistors 108 and 109, through the resistor 111 and the Zener diode 112. This same current also flows through the light emitting diode 85.

The output of light from the light emitting diode 85 is sensed by a photocell 72 of a suitable type such as a cadmium sulphide photocell. The photocell has one end connected to the force restoring coil 47 and has the other end connected to a line 88 which is connected at a junction between the capacitor 81 and the resistor 82. The amount of current or signal which is fed back to this junction is a function of the amount of light which is supplied to the photocell by the light emitting diode 85. The greater the amount of light, the lower the resistance of the photocell so that a greater signal is being fed back to the servo amplifier 61. This current flows through the capacitor 81 to the input 59 of the operational amplifier causing the servo loop to become unstable. This instablility causes oscillatory current to flow in the force restoring coil 47 and thereby causing dithering of the moving system at a predetermined frequency as, for example, 30 Hz but which may vary from 10 to 70 Hz and still obtain satisfactory results.

A more detailed description of the operation of the circuit may now be set forth. When no power is applied to the system, there is no charge on the capacitor 107. When power is applied, ±28 volts, for example, is supplied to the system. Current thus begins to flow from the +28 volts through the capacitor 107, through the resistor 121, to the −28 volt line. As this current flows, an exponentially increasing voltage is generated across the capacitor 107. This can be seen by the Darlington configured emitter-follower amplifier formed by the transistors 108 and 109. This voltage controls a current in the collector circuit of the transistor which, in turn, is connected to the light emitting diode 85. As the capacitor 107 continues to charge up, less and less voltage is available across the emitter resistor 111 thereby reducing the current through the transistors 108 and 109. The capacitor 107 continues to charge up to the point where the base voltage of transistor 108 or voltage across resistor 121 is about 1 volt greater than the voltage of diode 112. This shuts off the Darlington transistor arrangement and, therefore, no current flows in the light emitting diode 85. This removes the dither from the servo loop because at the time that the photocell 72 sees no light, its resistance becomes very large. The capacitor 107 continues to charge up until the total voltage across the lines 93 and 94 is reached. This ensures that transistors 108 and 109 are completely cut off and photocell 72 remains at maximum resistance.

During the charging period of capacitor 107, the current through the photocell 72 is oscillatory because the servo loop is unstable. This is true because the low resistance element has been inserted in series with the capacitor between the output of the amplifier and the input of the amplifier. In other words, the second order servo system which is stable in its own right is made unstable by introducing an additional time constant in the feedback circuit.

It is apparent from the foregoing that there has been provided a new and improved electronic pickoff method which is particularly useful for mechanical bearing assemblies in which it is very important to reduce friction as much as possible. The dither circuit utilizes a relatively simple network which requires a relatively small number of components so that it can be substantially reduced in size. In addition, it has the advantage in that it provides substantially improved results. It can be utilized in connection with fluid damped and electrically damped servo systems. The system and method operates by removing the damping and causing the servo loop to go into oscillation and then gradually restores damping to the servo loop to return the loop to its normal operating condition. The programming of dither into and out of the circuit can be readily controlled.

I claim:

1. In an electronic dither circuit for a mechanical bearing assembly, a housing, a member disposed in the housing, means in the housing in the form of a mechanical bearing assembly for pivotally mounting the member in the housing for movement about a pivot axis, means mounted in the housing forming a magnetic field, a torque coil connected to the member and disposed in the magnetic field in the housing, electronic means for supplying electrical energy to said torque coil, said electronic means including a closed loop servo system, a damping circuit coupled to said system to provide damping for said system, and means for removing said damping from said system upon application of electrical power after the existence of an unenergized state to induce oscillatory instability in said servo system to thereby cause oscillatory movement of the torque coil and the member connected thereto to minimize the effects of friction in the mechanical bearing assembly.

2. A circuit as in claim 1 together with means for restoring the damping to the closed loop servo system.

3. A circuit as in claim 2 wherein said means for restoring the damping to the closed loop servo includes means for gradually restoring the damping.

4. A circuit as in claim 3 wherein said means for gradually restoring the damping includes means for causing the damping to asymptotically approach stability and full damping.

5. A circuit as in claim 2 wherein said means for restoring the damping includes timing means.

6. A circuit as in claim 1 wherein said closed loop servo system includes an amplifier and means for forming a phase-lead network around the amplifier and wherein said means for removing said damping circuit from the closed loop servo system includes means for removing the phase lead from the amplifier.

7. A circuit as in claim 6 together with means for inserting a phase lag as the phase-lead is removed.

8. A circuit as in claim 1 wherein said means for removing said damping circuit from the servo system includes means for sudden removal of damping.

9. A circuit as in claim 5 together with means for resetting the timing means upon removal of electrical power to the electronic means.

10. In a method for electronically supplying dither to a mechanical bearing assembly of the type in which the bearing assembly is mounted within a housing and carries a member pivotally mounted in the mechanical bearing assembly for movement about a pivot axis, forming a closed loop servo system for maintaining said member in a predetermined position, damping said servo system to provide stability, removing the damping suddenly from the servo loop upon application of electrical power after the existence of an unenergized state to cause the servo loop to become unstable and oscillate to thereby cause oscillatory movement of the member to minimize friction in the mechanical bearing assembly, and gradually restoring the damping to the servo loop.

11. A method as in claim 10 together with the step of restoring said damping over a predetermined period of time.

12. A method as in claim 11 wherein the step of restoring said damping is performed so that the servo loop asymptotically approaches stability and full damping.

13. In an accelerometer, a housing, a pendulous member disposed in the housing, means in the form of a mechanical bearing assembly pivotally mounting the pendulous member in the housing for movement about a pivot axis, means in the housing forming a magnetic field, a torque coil connected to the member and disposed in the magnetic field, pickoff means for sensing the position of the member, electronic means connected to the pickoff means for supplying energy to the torque coil, said electronic means including a damped closed loop servo system and means for removing damping from the servo loop to cause the servo loop to oscillate to thereby supply oscillatory electrical energy to the torque coil to cause the torque coil to oscillate to thereby minimize the effects of friction in the mechanical bearing assembly.

14. An accelerometer as in claim 13 together with means for restoring the damping to the servo loop after the damping has been removed.

15. An accelerometer as in claim 14 together with timing means for gradually restoring the damping to the servo loop.

16. An accelerometer as in claim 13 together with means for sudden removal of damping upon application of electrical power to accelerometer after existence of an unenergized state.

17. An accelerometer as in claim 13 together with means for resetting the timing means upon removal of electrical power to the accelerometer.

* * * * *